June 22, 1965
P. ISAAC
3,190,694
SAFETY BELT SYSTEMS FOR VEHICLES
Filed April 22, 1963
3 Sheets-Sheet 1
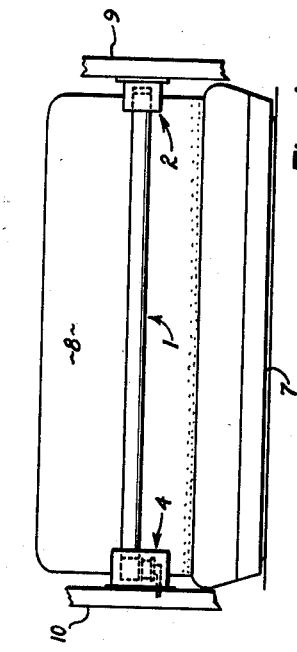
Fig. 1
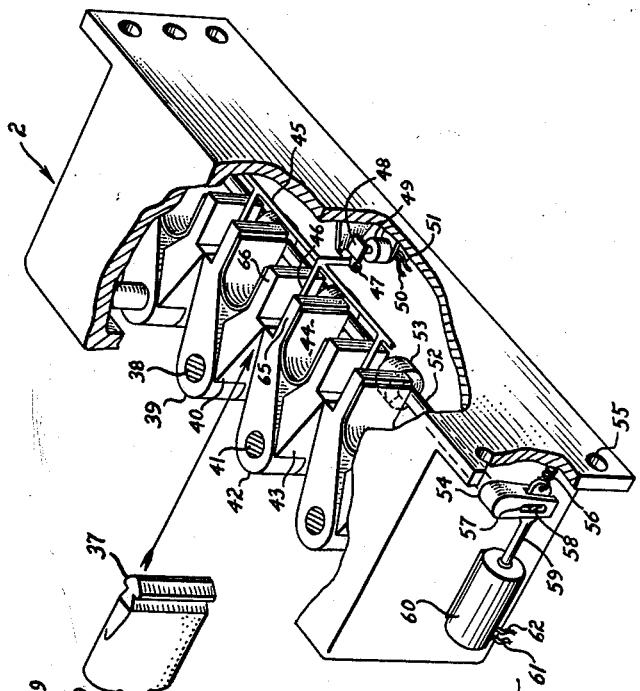
Fig. 2
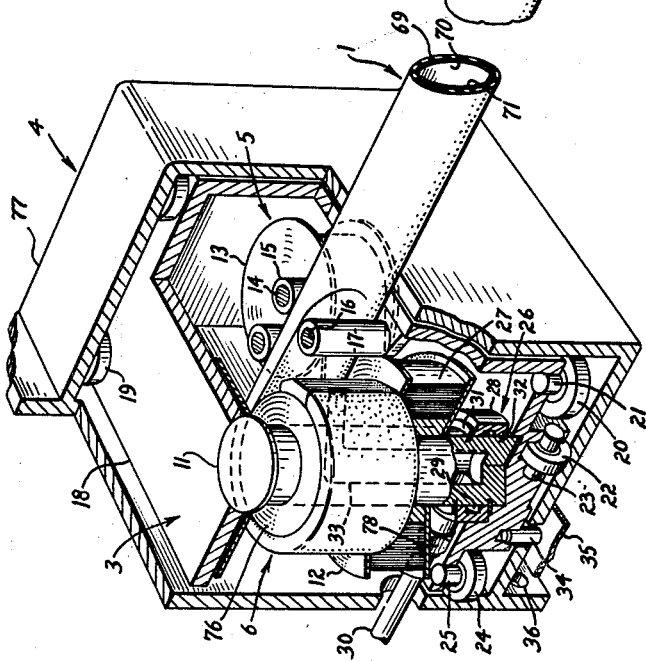
Peter Isaac

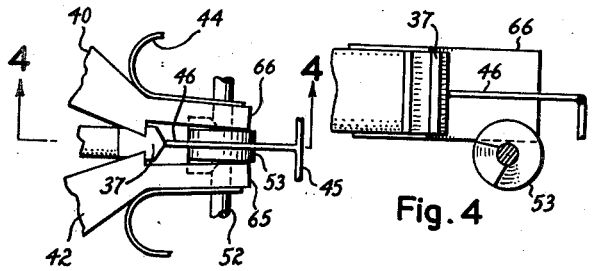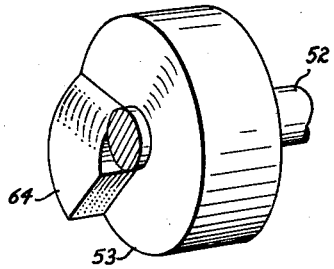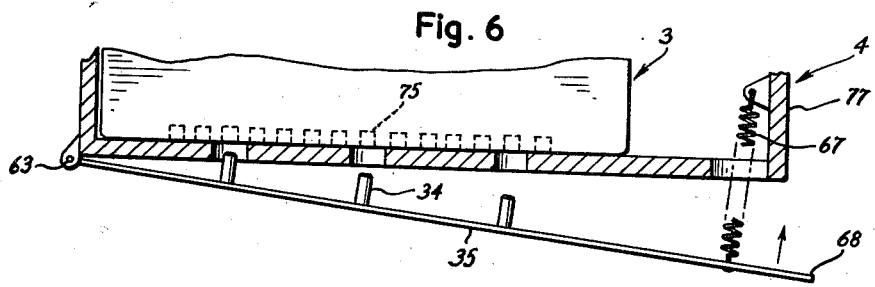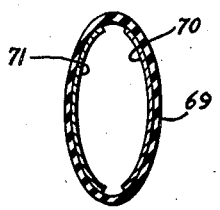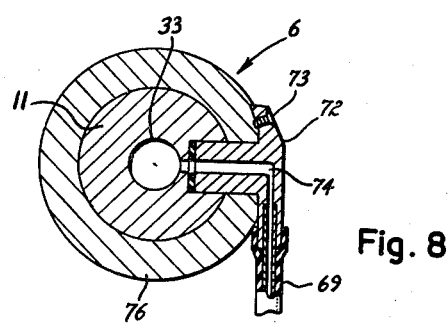

June 22, 1965 P. ISAAC 3,190,694
SAFETY BELT SYSTEMS FOR VEHICLES
Filed April 22, 1963 3 Sheets-Sheet 3

Peter Isaac

United States Patent Office 3,190,694
Patented June 22, 1965

3,190,694
SAFETY BELT SYSTEMS FOR VEHICLES
Peter Isaac, 9 Crown Hill Road, Apt. 410,
Toronto, Ontario, Canada
Filed Apr. 22, 1963, Ser. No. 274,637
11 Claims. (Cl. 297—388)

This invention relates to safety devices for vehicles and is more particularly concerned with a system essentially employing a safety strap which is stored on a reel and which traverses in front of occupants of a seat either manually or automatically.

The safety system which constitutes the present invention has been particularly devised for use in automobiles, but it will be understood that its use need not be so restricted since it may be used on other vehicles such as buses and aircraft.

The most common type of safety device now available for automobiles and aircraft consists of a simple safety belt which is fixed to the floor of the vehicle and is adapted to be tightened over the lap of the passenger so as to restrain the passenger against undue movement in the event of rapid deceleration of the vehicle. Unfortunately the known types of safety belts, or more commonly known as seat belts, have several disadvantages and drivers adopt them only with reluctance. It is found that people who install safety belts in their automobiles will often neglect to use them at all times, due to the bother of attaching them about themselves, as well as being restrained from normal movement in the seat. Further, it is found that drivers planning to make short trips will avoid the process of using their safety belt. It has been established that most accidents happen on short trips. A further drawback of these belts is that whereas it is common to install two sets of safety belts on the standard automobile seat, it frequently happens that three people occupy the seat whereby one of the three must do without a safety belt. A still further disadvantage of these belts is that they make the interior of the vehicle look slovenly and due to the metal buckles induce wear on the upholstery.

It is the chief object of this invention to provide a safety system which will serve all the occupants of a seat, and allow normal movement of the occupants on the seat.

A further object of this invention is to provide a safety system which will operate automatically and thereby safeguard against the dangers inherent when drivers forget to use their safety belts.

A still further object is to provide a neat safety system employing a strap which is stored on a spring loaded reel and which may be manually operated for those not wishing to go to the expense of an automated system.

It will be declared from the outset that the automated embodiment of the invention disclosed herein is a special application of a copending patent application entitled "Inflatable Structural Members" bearing Serial Number 231,167 filed October 17, 1962.

The invention will be more thoroughly understood from the following description of a preferred embodiment thereof as read with reference to the accompanying drawings.

In the drawings,

FIGURE 1 is a front elevation of a seat in an automobile showing the safety strap in the position it is used in while driving, with the strap spanning the vehicle from one side to the other in front of where the occupants would be on the seat.

FIGURE 2 is a perspective view of the safety system showing the strap in transit from one side of the vehicle to the other side in the rigid state, details of the reel, storage means, and supporting structure which are attached to one side of the vehicle and from which the strap emerges, and details of the latching mechanism which is mounted on the other side of the vehicle for securing the other end of the strap.

FIGURE 3 is a plan view of a set of jaws of the latching mechanism which shows how the end fitting of the strap is trapped between the jaws and which also shows a finger of the indicating means which indicate when the end fitting is trapped.

FIGURE 4 is a cross sectional view along the lines 4—4 of FIGURE 3 showing the position of one of the cams for spreading the jaws when required for releasing the end fitting of the strap.

FIGURE 5 is an enlarged perspective view of one of the cams shown in FIGURES 2, 3 and 4 for spreading the jaws.

FIGURE 6 shows the manner in which the carriage supporting the reel may be shifted with respect to the supporting structure for positional adjustment of the strap with respect to the occupants of a seat in the vehicle.

FIGURE 7 is a cross section of the strap showing the details of construction of one embodiment thereof and its shape when it is in the rigid state.

FIGURE 8 is a cross sectional view through the reel 6 of FIGURE 2 showing how one end fitting of the strap is attached to the reel and the passageways whereby fluid may be fed into the interior of the strap for the purpose of inflating it.

Figure 9:
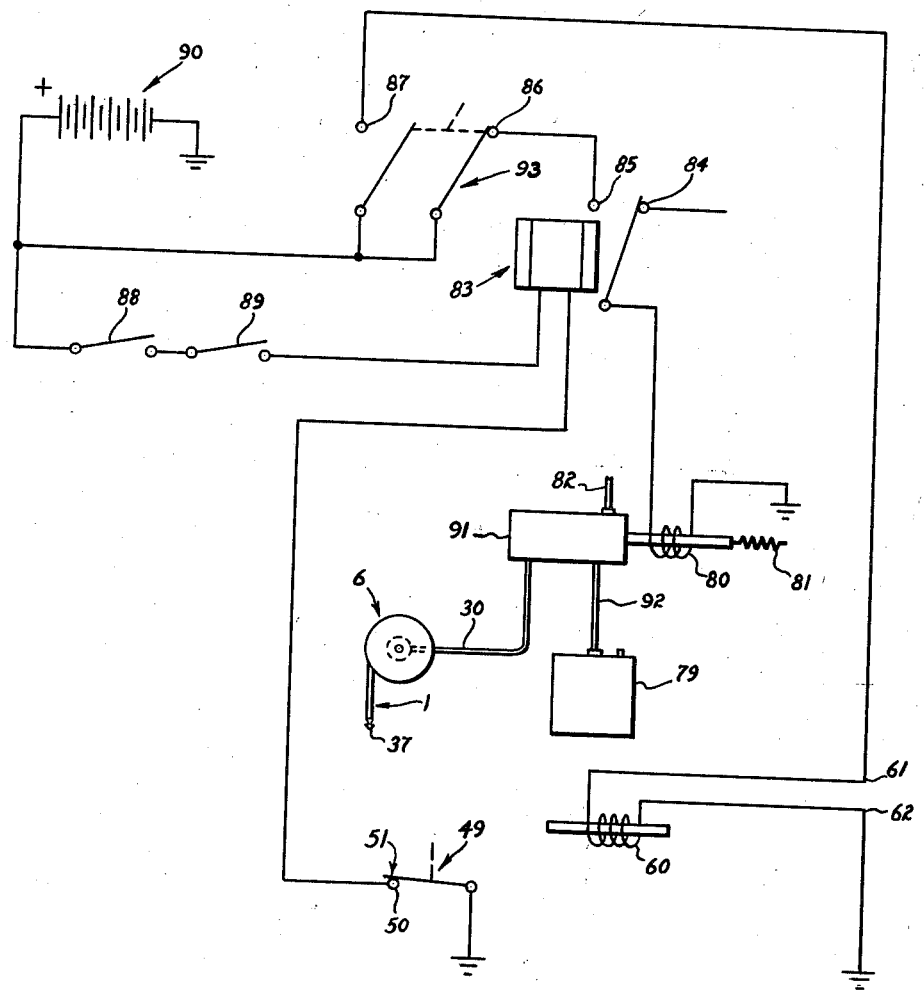

FIGURE 9 is a schematic of the controls of a typical vehicle wherewith the strap may be compelled to automatically traverse the vehicle in the rigid state and latch itself in the latching mechanism and then cause the strap to revert to the supple state for the convenience of the occupants of the seat and also whereby the strap may be released from the latching mechanism and allowed to return upon the reel when the occupants of the vehicle wish to leave their seat.

Describing first the automated embodiment of the invention, it will be best understood with reference to FIGURES 1 and 2. The safety system essentially consists of a selectively supple selectively rigid strap 1 which traverses the vehicle in front of the occupants of a seat in the region of the waist line when it is in use, as is best seen in FIGURE 1, a reel 6 on which the strap is reeled when not in use, storage means which may comprise a carriage 3 for positioning the strap with respect to the occupants of a seat, motor means 5 for rotating the reel in such a way as to return the strap upon the reel, a supporting structure 4 within which the reel carriage 3 may be selectively positioned, a latching mechanism 2 for receiving and trapping the end fitting 37 of the strap 1 after it has traversed the vehicle and the controls wherewith the strap 1 may be inflated and compelled to traverse the vehicle in the rigid state and deflated for the convenience of the occupants after it is positioned in front of the occupants.

The strap 1 is preferably compelled to traverse the vehicle only after the engine of the vehicle has been started and a drive selection has been made as will be hereinafter described. Generally after a drive selection has been made all the occupants of the vehicle are in a position to receive the safety strap in front of them, it being understood that there will be one strap for each seat in the vehicle.

The strap terminates in an end fitting 37, which as is best indicated in FIGURE 3, is so designed that it is automatically trapped between a set of spring loaded jaws when it enters the latching mechanism 2. The strap is deflated after it enters the latching mechanism and thereby becomes supple for the convenience of the occupants of the vehicle. When the occupants wish to leave their seat the latching mechanism is actuated, as will be described, which unlatches the end fitting 37 and allows the spring motor 5 to return the strap upon the reel 6.

The positions of the supporting structure 4 of the reel and the latching mechanism 2 with respect to the vehicle will be best understood with reference to FIGURE 1 which shows a front elevation of a seat 7 and a back rest 8 of the seat. The supporting structure 4 in an automobile is secured to the side 10 of the vehicle, which in the front seat is the door, by using the mounting holes 36 provided, as seen in FIGURE 2. The supporting structure 4 replaces the usual arm rest. The latching mechanism 2 is secured to the other side 9 of the vehicle, which may be a door, directly opposite from the supporting structure 4, by using the holes 55 provided. The latching mechanism 2 also replaces the arm rest usually found in that vicinity. In vehicles such as buses or aircraft where aisles are required, the supporting structure 4 and latching mechanism 2 may be attached to the seat itself rather than the sides of the vehicle.

Operating within the supporting structure 4 are storage means comprising a carriage 3 which houses the reel 6, and the constant torque spring motor 5. The carriage 3 is mounted on rollers so that it may readily be positioned within the supporting structure thereby providing for positional adjustment of the strap in front of the occupants. The rollers 19, 20, 24 and several others not shown, provide for guidance in the vertical plane, and the roller 22 and others not shown provide for guidance in the horizontal plane. Rotatably mounted in the frame 18 of the carriage 3 is a reel 6 as seen in FIGURE 2. The reel consists of a shaft 11 and a drum 76, the shaft journalling in the frame 18. The strap 1 terminates in an end fitting 72 which is attached to the drum 76 of the reel 6 by means of the screw 73 as seen in FIGURE 8. The end fitting 72 has a passageway 74 which communicates with the passageway 33 in the shaft 11 which in turn communicates with the fluid supply line 30 through the medium of the fluid coupling 26, as seen in FIGURE 2.

The fluid coupling 26 consists of an annular disc 28 which contains an annular groove 29 which communicates with the fluid line 30 through the medium of the tube coupling 78. The fluid coupling 26 is retained on the shaft 11 by means of the retainers 31 and 32. It should be understood that the type of coupling shown is for illustrative purposes only since there are many types available which would be suited for this purpose.

Also contained within the carriage 3 is a constant torque spring motor 5. This type of spring motor is in common use in equipment such as cameras. The output drum 12 of the motor is attached to the shaft 11 of the reel 6. The take-up drum 13 of the motor is also journalled in the frame 18 of the carriage 3. The spring element 27 of the motor essentially is a strip of preformed spring steel, a portion of which is wound on the drum 12, the end thereof being secured to the drum, and the remainder of the spring element is wound upon the take-up drum 13 in the opposite direction. When the strap 1 leaves the reel 6 it winds up the spring motor 5 and when the end fitting 37 of the strap is released, it enables the motor to wind the strap upon the reel.

Also contained within the carriage 3 are several vertically mounted rollers. The rollers 15 and 17 which are journalled on the pins 14 and 16 respectively, which in turn are mounted in the frame 18 of the carriage 3, straddle the strap 1 in the aperture of the carriage 3 and serve to direct the strap 1 in a direction towards the latching mechanism 2 as the strap leaves the reel.

The carriage 3 may be positioned in several positions with respect to the supporting structure 4. This is necessary to compensate for various positions of the seat in the vehicle and for passengers of various sizes. The method of accomplishing this may be understood with reference to FIGURES 2 and 6. Mounted underneath the supporting structure 4 is an operating lever 35, one end of which journals on the pin 63 and the other end 68 projects beyond the edge of the supporting structure 4 so it may readily be operated by depressing it with a finger against the action of the spring 67. The lever 35 has several shear pins 34 which engage the recesses 75 in the carriage 3. It will be evident from studying FIGURE 6 that the carriage 3 may readily be shifted in the supporting structure 4 and latched thereto by means of the shear pins 34.

Describing the selectively supple selectively rigid strap 1 in detail, it basically is an inflatable member and may take several forms as described in U.S. patent application Serial Number 231,167. The preferred form of the strap is seen in FIGURES 2 and 7. As shown it basically consists of two strips 70 and 71, made of steel with high resilience, which are bonded to the internal wall of the supple tube 69 which may be made of material such as nylon. The strap 1 terminates in two end fittings 37 and 72 as already described. The strap may be attached to the end fittings in several ways so as to avoid leakage of the fluid. As shown in FIGURE 8 the strips and tube are both attached to the boss of the end fitting 72, the strips preferably being riveted or welded for strength.

It will be evident from the preceding description that if a fluid supply is connected to the supply line 30, the strap 1 becomes inflated as shown in FIGURES 2 and 7. Furthermore the pressure tends to compel the strap 1 to leave the reel 6 against the restraining action of the spring motor 5. It will also be appreciated that when the fluid pressure is relieved, the strap 1 will deflate and due to the resilience of the strips 70 and 71 will spring back to an essentially compact rectangular shape, thereby becoming supple and hence suitable for reeling on the drum 76 of the reel 6.

The latching mechanism 2 is best seen in FIGURE 2. It essentially consists of an elongated framework as shown which may be mounted on the side 9 of the vehicle by using the holes 55 provided. The body of the latching mechanism also serves as an arm rest as already mentioned. Contained within the framework of the latching mechanism are a number of jaws for receiving and latching the end fitting 37 of the strap. The jaws 39 and 40, for example, both journal on pin 38 and the jaws 42 and 43 are both pivotally mounted on pin 41. Each jaw terminates in an offset arm. For instance the two arms 65 and 66 are offset to receive the end fitting 37. As seen, all the arms are spring loaded, the arms being forced together in groups of two by means of the U-shaped leaf springs 44. It will be evident from the design of the jaws that if the end fitting 37 of the strap enters say a pair of jaws such as 40 and 42 it will become trapped between the arms 65 and 66 as seen in FIGURE 3 and due to the offset spacing of the jaws it cannot be released except by first spreading the arms. When necessary this is accomplished by means of the camshaft 52 best seen in FIGURE 2. The camshaft 2 has a number of cams 53, one of which is located between each set of arms. When the camshaft is rotated, the cams spread each set of adjacent arms thereby permitting the end fitting 37 of the strap to be withdrawn from the latching mechanism.

The operating means of the camshaft are best seen in FIGURE 2. Attached to one end of the camshaft 52 is an arm 54 which has a slot 57. The arm is operated by means of the solenoid 60. The shaft 59 of the solenoid protrudes through the slot in the arm and is retained therein by means of the pin 58.

In the normal state of the latching mechanism, the spring 56 restrains the camshaft from spreading the arms of the jaws. When required, the solenoid 60 is energized by supplying power to the leads 61 and 62. The camshaft is thereby rotated sufficiently to spread the arms of the jaws to allow the end fitting 37 to leave the latching mechanism.

As will be described presently, it is necessary to detect when the end fitting 37 has arrived within the latching mechanism 2. The method shown in FIGURE 2 illustrates a microswitch 49 which is actuated by means of the lever 48, which pivots on the pin 47 attached to the latching mechanism body. The lever 48 has a number of fingers 46, one finger being located between each set of arms, the fingers all being attached to the horizontal bar 45. It will be evident that when the end fitting 37 enters a set of jaws such as 40 and 42 as shown in FIGURE 3 the end of the end fitting will contact the finger 46 and thereby actuate the microswitch 49 which, as will be described, provides the control signal to deflate the strap.

It is essentially the intent of this invention that the safety system as described will be operated completely automatically. A schematic of the controls which are necessary to do this is given in FIGURE 9 and the automatic operation of the system will be best understood with reference to this figure. Shown in FIGURE 9 is the strap 1, emerging from the reel 6. The fluid supply line 30 is connected to a spring loaded directional valve 91. The fluid supply line 82 feeds fluid under pressure from the fluid power system of the vehicle to the directional valve 91. The fluid supply is shut off by the valve 91 when the solenoid 80 thereof is de-energized. In this condition of the valve 91 the fluid lines 30 and 92 communicate via a passage in the valve. When the solenoid 80 is energized against the action of the spring 81 the fluid lines 82 and 30 communicate via another passage in the valve allowing fluid to flow from the line 82 to line 30 to inflate the supply rigid strap 1, the line 92 being isolated from the valve 91 in this position of the valve. The numeral 88 designates the ignition switch of the vehicle and the numeral 89 designates a switch operated by the transmission of the vehicle which is closed when the transmission is in one of the drive selections.

The operation of the safety system will now be described. Starting with the condition when the ignition switch 88 is open, the relay points 84 and 85 are open. The manual switch 93 is spring loaded in the position shown in FIGURE 9. Solenoids 60 and 80 are thus de-energized. The fluid line 30 communicates with the line 92 thereby allowing any fluid in the strap 1 to drain to the tank 79 via fluid line 92. Consequently the spring motor 5 shown in FIGURE 2 will withdraw the strap upon the reel 6 as already described. After the passengers have entered the vehicle and the driver closes ignition switch 88 the engine may be started without operating the strap. When the driver selects a drive position of the transmission the switch 89 is closed. This actuates the relay 83 closing contacts 84 and 85. This allows the solenoid 80 to be actuated which operates the directional valve 91 so that fluid line 82 communicates with the fluid line 30 as described beforehand. As the fluid enters the strap 1 it compels it to leave the reel in the inflated and hence rigid state. When the end fitting 37 of the strap enters the latching mechanism 2 seen in FIGURE 2 it actuates the microswitch 49 as already described thereby opening the contacts 50 and 51. This de-energizes the relay 83 and hence solenoid 80. The spring 81 of the valve 91 actuates the valve 91 allowing the fluid supply line 30 to communicate with the tank 79 through fluid line 92. This allows the strap 1 to deflate and become supple for the convenience of the passengers.

If at any time a passenger wishes to leave the vehicle, the strap 1 is allowed to return upon the reel 6. This may be done by operating the push button switch 93 which is spring loaded so that it remains in the position shown in FIGURE 9. When this switch is operated it energizes the solenoid 60 which with reference to FIGURE 2 disengages the latching mechanism as already described permitting the spring motor 5 to retract the strap upon the reel. Although it is not shown in this manner the switch 93 may be conveniently mounted on one side of the supporting structure 4, which is placed on the driver's side of the vehicle.

It will be appreciated that many modifications may be made to this invention without basically altering the nature of the invention. As already described the strap 1 may be constructed in several ways. Although a spring motor is used to operate the reel, an electric or hydraulic motor could conveniently be employed. Furthermore although the camshaft 52 is operated by a solenoid, it will be evident that a hydraulic cylinder or electric motor could be used. Likewise the fluid coupling 26 may be one of several types commonly used.

It will be pointed out that the invention disclosed herein has a simplified application which has not been illustrated because it can be understood with reference to the drawings submitted. In applications such as aircraft where it is common to have individual seats with separate arm rests for each person, a manually operated system may be employed. This system does not require any of the control elements shown in FIGURE 9. Likewise, the fluid coupling 28, the solenoid 60, microswitch 49 and operating lever 48 are not required. The strap 1 remains in the supple state at all times and is returned upon the reel 6 when not required by the action of the spring motor 5 as discussed with the automated application. In operation, the occupant of a seat manually pulls the end fitting 37 of the strap and inserts it between a suitable set of jaws in the latching mechanism 2. When the occupant wishes to release the strap 1, he operates the lever 54 manually thereby spreading the jaws as previously described. The strap 1 returns upon the reel by the action of the spring motor 5.

The manually operated system just discussed may also be employed in automobiles and buses where the cost of an automated system may not be justified. It has advantages over the simple safety belt in that it provides for easier adjustment to accommodate passengers of various sizes, it is neater in appearance and due to the absence of metallic buckles is easier on the upholstery.

A still further modification applicable to both the manual and automated system involves elimination of the motor means 5. With reference to FIGURES 2 and 7 it will be apparent that the two resilient strips of metal 70 and 71 may in themselves be precurled as a coil spring such that the tendency of the strap 1 is to return upon the reel 6, without any additional assistance by a motor. This permits the supporting structure 4 to be compactly designed occupying not much more space than a normal arm rest. Where desired a spring motor may be used as a supplement to assist the recoiling action of the strap.

Due to the basic nature of this invention and because of the various modifications possible thereto, as discussed, the invention should not be construed in the limited sense illustrated but by the following claims.

What I claim as my invention is:

1. A safety system for a vehicle to prevent occupants of said vehicle from being thrown from their seat due to inertial forces including a selectively supple, selectively rigid, inflatable strap which may be caused to traverse in front of at least one occupant of said seat, storage means for storing said strap when not in use, said storage means comprising a reel to which said strap is attached and upon which it may be wound, means for extending said strap from said storage means, means for returning said strap to said storage means, said safety system also including means for rendering said strap selectively supple by deflation and selectively rigid by inflation and a latching mechanism for latching the extended end of said strap when said strap is in front of at least one occupant of said seat.

2. A safety system for a vehicle to prevent occupants of said vehicle from being thrown from their seat due to inertial forces comprising a supple strap which may be caused to traverse in front of at least one occupant of said seat, said strap having a fitting at one end thereof, storage means for storing said strap when not in use, said storage means comprising a reel on which said strap may be reeled when not in use, means for housing said reel and means for returning said strap upon said reel, said safety system also including a latching mechanism for latching said fitting when said strap is in position in front of at least one occupant of said seat, said latching mechanism comprising at least one pair of jaws, housing means, each said jaw being pivotally mounted at one end thereof in said housing means, spring means for rotatably urging the other ends of a pair of said jaws towards each other to engage said fitting when therebetween, said jaws of each pair being placed relative to each other such that a pull on said fitting when therebetween will pivotally urge them towards each other, and means for spreading said jaws.

3. The safety system according to claim 1 which includes a supporting structure for supporting said storage means and in which said storage means comprises a carriage which is positionable with respect to said supporting structure, and which includes means for latching and unlatching said carriage to said supporting structure at a plurality of positions.

4. The safety system according to claim 3 in which said supporting structure comprises an arm rest for an occupant of said vehicle, and said latching mechanism also comprises an arm rest for an occupant of said vehicle.

5. The safety system according to claim 1 in which said latching mechanism comprises a housing and a pair of jaws pivotally mounted therein, spring means for rotatably urging said jaws towards each other, said strap having an end fitting engageable in said latching mechanism, said jaws engaging said end fitting of said strap by the assistance of said spring means when said end fitting enters said latching mechanism, and which includes means for spreading said jaws when required for disengaging said end fitting, said spring means resisting the disengaging action.

6. The safety system according to claim 5 in which said latching mechanism includes in addition a camshaft rotatably mounted in said housing, said camshaft spreading said jaws when it is rotated, means for rotating said camshaft, and means indicating when said end fitting of said strap is engaged by said pair of jaws.

7. The safety system according to claim 6 which includes a solenoid attached to said housing, said solenoid rotating said camshaft through the medium of an arm attached to said camshaft when it is energized.

8. The safety system according to claim 6 in which said indicating means comprises a lever with a plurality of fingers, said lever being pivotally mounted in said housing, one end of said lever operating a microswitch also attached to said housing, one of said fingers being contacted as said end fitting enters said latching mechanism.

9. The safety system according to claim 1 in which said strap comprises two strips of elastic resilient material attached within a tube of supple material, two end fittings of which one is attached to said reel and the other is free to enter said latching mechanism, said strips being secured to said end fittings.

10. The safety system according to claim 9 in which said strips are precurled in the form of a single coiled spring, the tendency of said strap being to return upon said reel, said strap providing a supplementary means of returning itself upon said reel.

11. The safety system according to claim 1 in which said strap comprises two resilient strips of metal, said strips being precurled in the form of a helical spring, the tendency of said strap being to return upon said reel, said strap providing the means whereby it returns upon said reel.

References Cited by the Examiner

UNITED STATES PATENTS

| | | | |
|---|---|---|---|
| 2,852,270 | 9/58 | Hunt | 297—388 |
| 2,855,028 | 10/58 | Matthews | 297—388 |
| 3,065,027 | 11/62 | Misslich | 297—388 |
| 3,116,092 | 12/63 | Spranger | 297—388 |

FRANK B. SHERRY, *Primary Examiner.*